(12) United States Patent
Lee et al.

(10) Patent No.: US 11,087,932 B2
(45) Date of Patent: Aug. 10, 2021

(54) PREPARATION METHOD OF ANODE ACTIVE MATERIAL FOR PSEUDOCAPACITOR

(71) Applicant: LG CHEM, LTD., Seoul (KR)

(72) Inventors: Dongjun Lee, Daejeon (KR);
Seokhyun Yoon, Daejeon (KR);
Byunggook Lyu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/646,478

(22) PCT Filed: Sep. 14, 2018

(86) PCT No.: PCT/KR2018/010865
§ 371 (c)(1),
(2) Date: Mar. 11, 2020

(87) PCT Pub. No.: WO2019/054803
PCT Pub. Date: Mar. 21, 2019

(65) Prior Publication Data
US 2020/0273634 A1 Aug. 27, 2020

(30) Foreign Application Priority Data
Sep. 15, 2017 (KR) .................. 10-2017-0118857

(51) Int. Cl.
*H01G 11/46* (2013.01)
*H01G 11/02* (2013.01)
(Continued)

(52) U.S. Cl.
CPC .............. *H01G 11/46* (2013.01); *H01B 1/08* (2013.01); *H01G 11/02* (2013.01); *H01G 11/24* (2013.01); *H01G 11/86* (2013.01)

(58) Field of Classification Search
CPC ..................................................... H01G 11/86
See application file for complete search history.

(56) References Cited

U.S. PATENT DOCUMENTS 8,900,755 B2    12/2014   Liu et al.
2002/0163770 A1  11/2002  Shiue et al.
(Continued)

FOREIGN PATENT DOCUMENTS

CN    101734726 B    5/2012
CN    106981376 A    7/2017
(Continued)

OTHER PUBLICATIONS

Tang.(2006).Facile Route to a-FeOOH and a-Fe2O3 Nanorods and Magnetic Property of a-Fe2O3 Nanorods.College of Chemistry, Chemical Engineering and Materials Science, Shandong Normal University.vol. 45, pp. 5196-5200.
(Continued)

*Primary Examiner* — Eric W Thomas
(74) *Attorney, Agent, or Firm* — Dentons US LLP

(57) ABSTRACT

The present disclosure provides a method of preparing an anode active material having high specific capacitance in a simple and inexpensive process without applying high temperature and high pressure conditions by synthesizing urchin-shaped goethite iron oxide (alpha-FeOOH) using an aqueous solution containing thiosulfate ions and sulfate ions, followed by heat treatment to synthesize hematite iron oxide (alpha-$Fe_2O_3$) having a nano-sized urchin-like structure, in order to provide an anode for a pseudocapacitor that is excellent in specific capacitance.

16 Claims, 5 Drawing Sheets

(51) Int. Cl.
*H01G 11/24* (2013.01)
*H01G 11/86* (2013.01)
*H01B 1/08* (2006.01)

(56) References Cited

U.S. PATENT DOCUMENTS

| | | |
|---|---|---|
| 2011/0070495 A1 | 3/2011 | Ban et al. |
| 2012/0077080 A1 | 3/2012 | Liu et al. |
| 2013/0251624 A1 | 9/2013 | Yu |
| 2014/0178759 A1 | 6/2014 | Worsley et al. |
| 2014/0220444 A1 | 8/2014 | Lee et al. |

FOREIGN PATENT DOCUMENTS

| | | |
|---|---|---|
| EP | 2800177 A1 | 5/2014 |
| JP | 49-38900 A | 4/1974 |
| JP | 50-60492 A | 5/1975 |
| JP | 2002-237435 A | 8/2002 |
| JP | 2012-028248 A | 2/2012 |
| JP | 2013-53060 A | 3/2013 |
| JP | 2015-054299 A | 3/2015 |
| JP | 2016-505488 A | 2/2016 |
| JP | 2016-199439 A | 12/2016 |
| JP | 2017-092132 A | 5/2017 |
| KR | 10-1157620 B1 | 6/2012 |

OTHER PUBLICATIONS

Wu.(2006).Synthesis of Hematite (a-Fe2O3) Nanorods: Diameter-Size and Shape Effects on Their Applications in Magnetism, Lithium Ion Battery, and Gas Sensors. J. Phys. Chem. vol. 110, pp. 17806-17812.
Sarkar.(2013).High-Performance Pseudocapacitor Electrodes Based on a-Fe2O3/MnO2 Core-Shell Nanowire Heterostructure Arrays. The Journal of Physical Chemistry. vol. 117, pp. 15523-15531.
Aadil.(2016).Superior Electrochemical Activity of a-Fe2O3/rGO Nanocomposite for Advance Energy Storage Devices, Journal of Alloys and Compounds. vol. 689, pp. 648-654.
International Search Report from PCR/KR2018/010865, dated Jan. 30, 2019.
Written Opinion of the ISA from PCT/KR2018/010865, dated Jan. 30, 2019.

[FIG. 1]
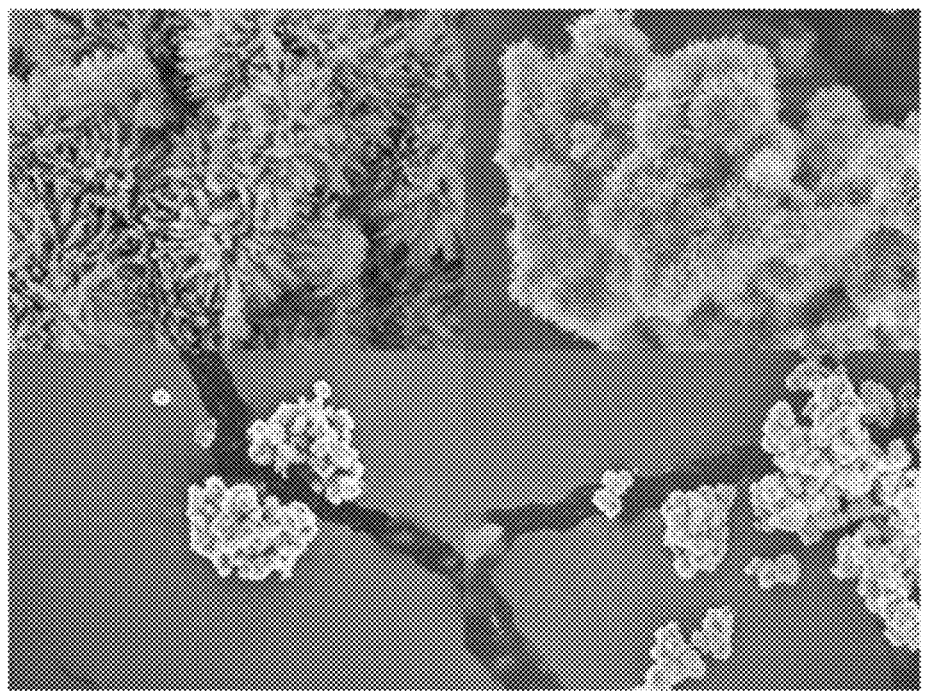
[FIG. 2]
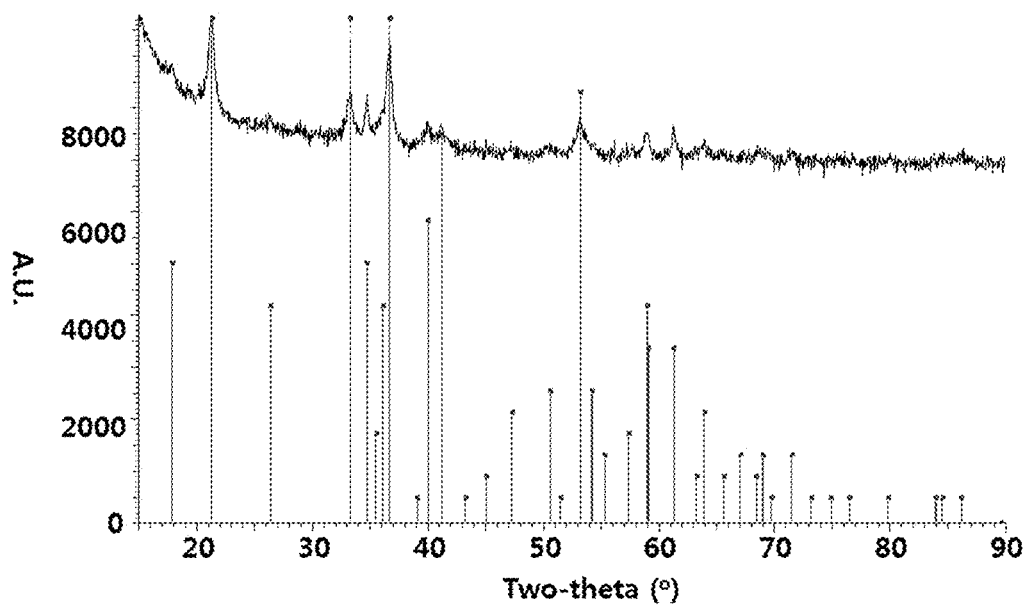

[FIG. 3]
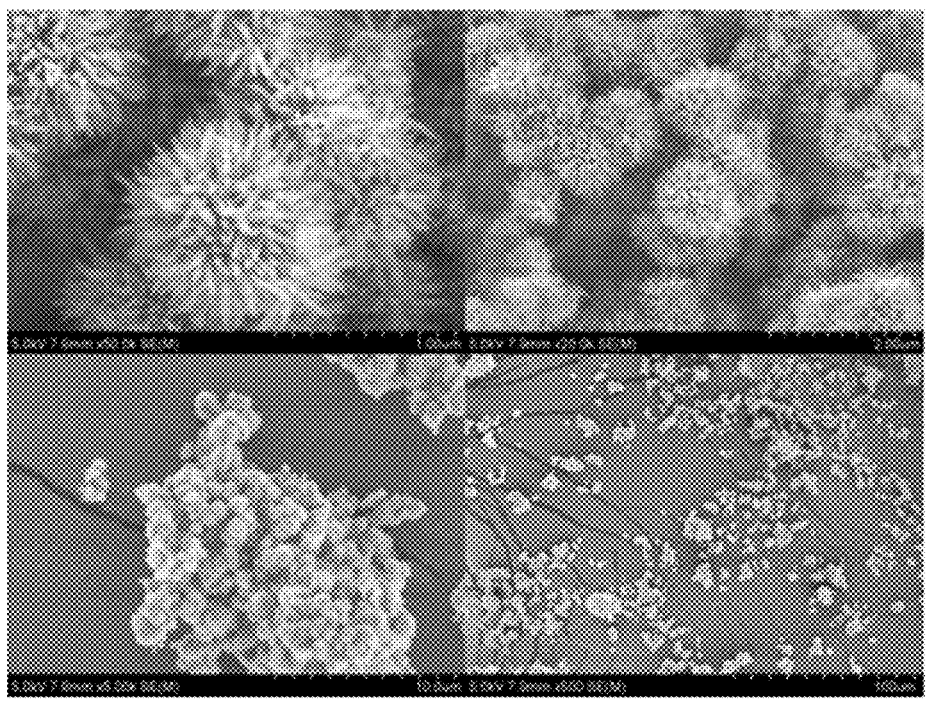
[FIG. 4]
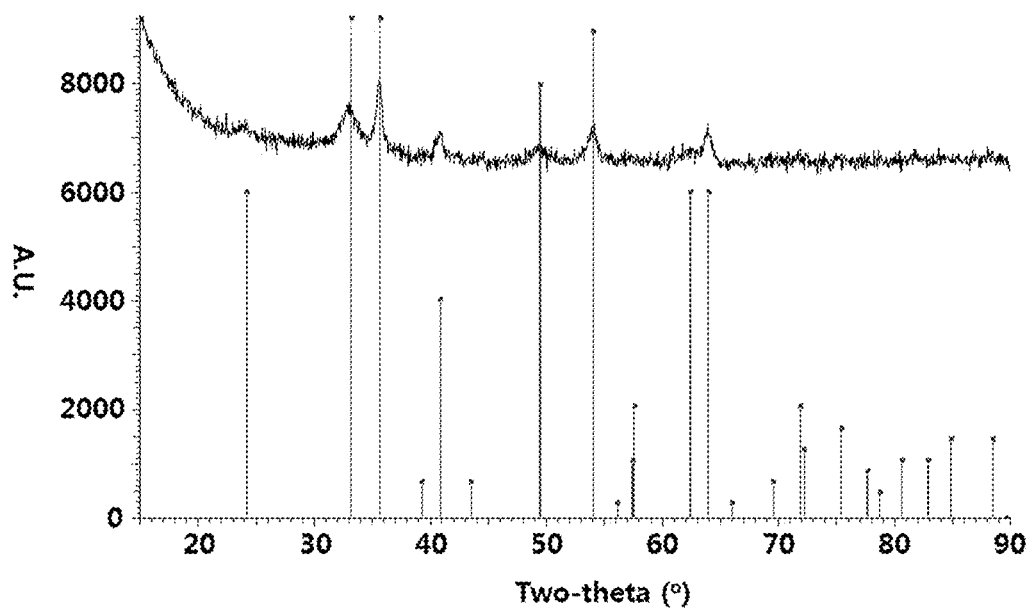

【FIG. 5】
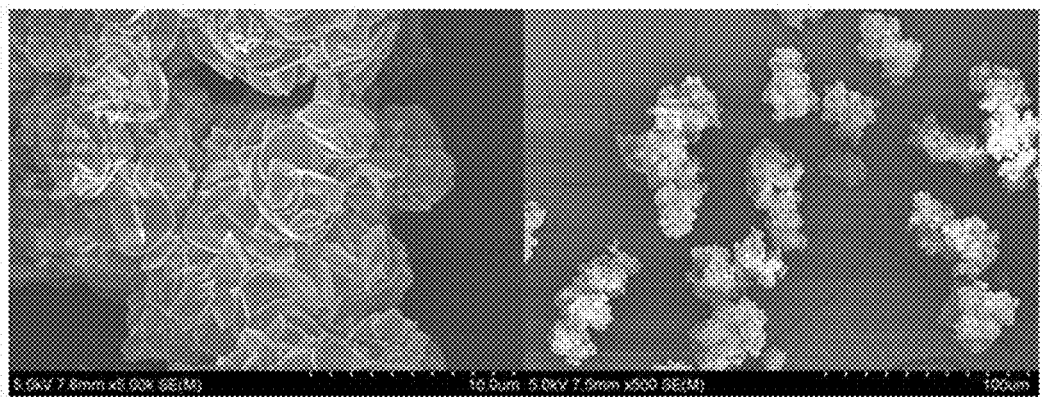
【FIG. 6】
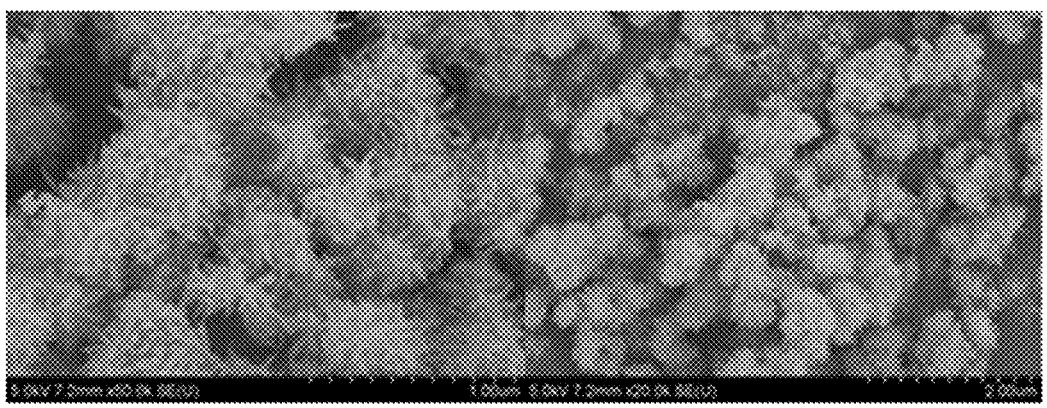
【FIG. 7】
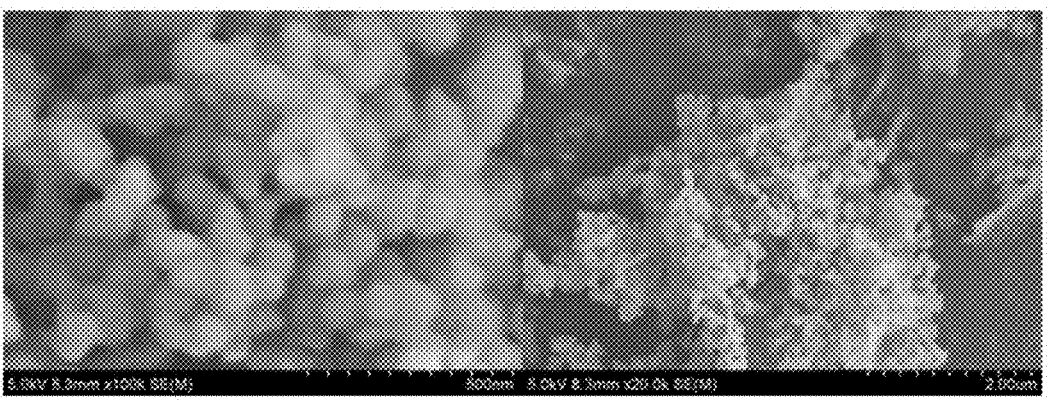

[FIG. 8]
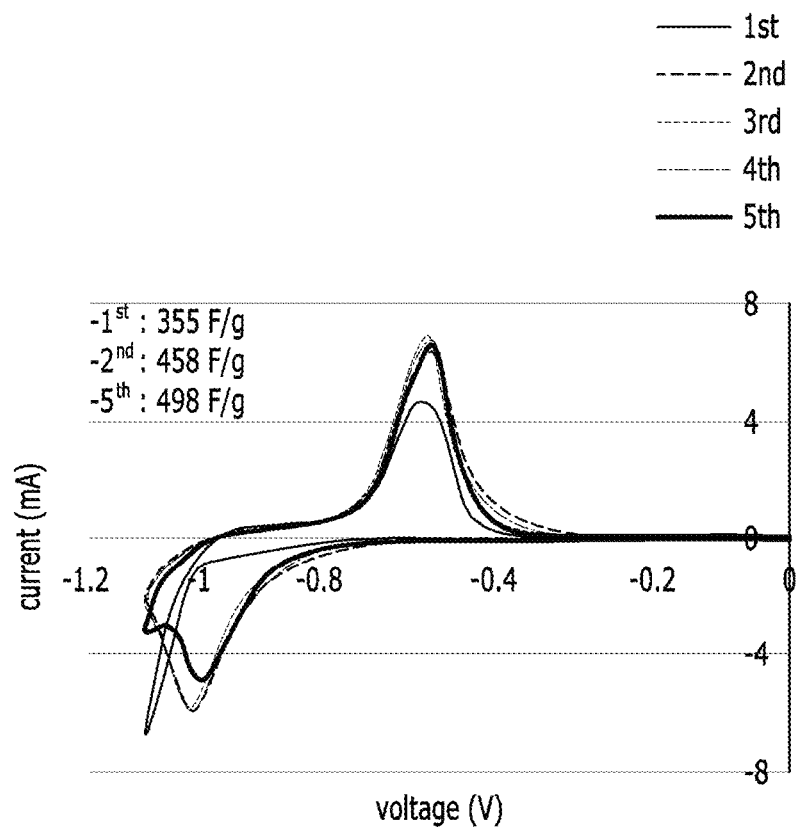
[FIG. 9]
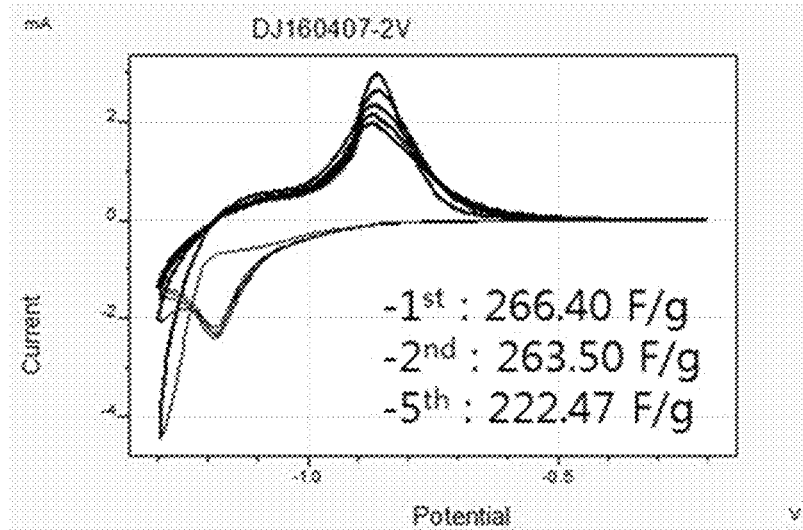

[FIG. 10]
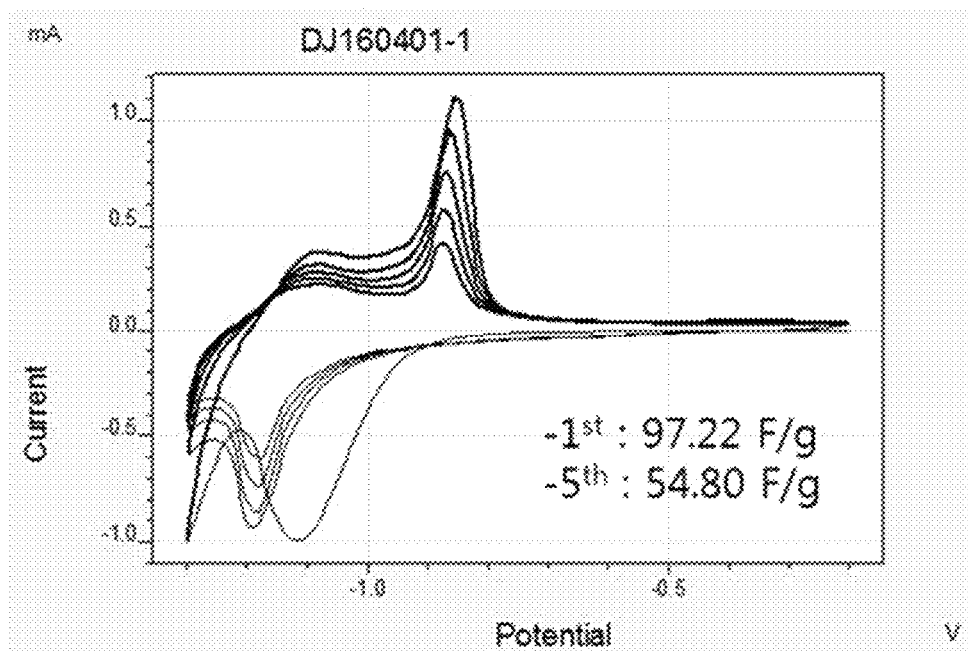

PREPARATION METHOD OF ANODE ACTIVE MATERIAL FOR PSEUDOCAPACITOR

The present application is a National Phase entry pursuant to 35 U.S.C. § 371 of International Application No. PCT/KR2018/010865 filed on Sep. 14, 2018, and claims priority to and the benefit of Korean Patent Application No. 10-2017-0118857 filed on Sep. 15, 2017 with the Korean Intellectual Property Office, the disclosures of which are incorporated herein by reference in their entirety.

FIELD

The present disclosure relates to a preparation method of an anode active material for a pseudocapacitor, and more particularly, to a method of preparing an anode active material for a pseudocapacitor having high specific capacitance in a simple and inexpensive process without applying high temperature and high pressure conditions, and an anode composition for a pseudocapacitor including the same.

BACKGROUND

Electrochemical capacitors store electrical energy by forming an electrical double layer between a surface of an electrode and an electrolyte. In this case, since electricity is not generated by a chemical reaction like in a battery but is simply generated by the electrical double layer, the electrochemical capacitor does not damage the electrode itself, and thus its lifetime is almost infinite. In addition, since it has faster charging and recharging times, a large amount of current can be stored in a short time. Therefore, this device is an important electrical storage unit when high power is required.

In particular, the need for an energy storage device having both high energy density and high power has increased recently. Supercapacitors are being researched as an energy storage device with higher energy density than conventional capacitors, and higher power than conventional lithium ion batteries.

These supercapacitors can be simply divided into electrical double-layer capacitors (EDLC) and pseudocapacitors, depending on their energy storage mechanisms. In particular, secondary batteries currently in use, such as lithium ion batteries and lithium polymer batteries, have low power relative to high capacity (per weight). In order to solve the low power of the secondary battery, the EDLC (electric double-layer capacitor) was developed based on an electrochemical phenomenon on a surface of carbon materials. The EDLC is excellent in power and stability because there is no oxidation-reduction reaction by electron transfer, but its capacity is so low that it is applied only to limited fields.

In order to overcome the low capacity of the carbon material-based EDLC, studies are being actively conducted on pseudocapacitors in which a charge is stored through a Faradaic reaction occurring on a surface of nanostructures. In particular, pseudocapacitors can exhibit greater specific capacitance using additional redox reactions. As such, various studies have been made on pseudocapacitors using reversible oxidation-reduction reactions at the electrode/electrolyte interface. In relation to a cathode material of the pseudocapacitor, various studies such as on oxides and hydroxides mixed with transition metals (e.g., nickel, cobalt, manganese, or ruthenium) have been made. However, studies on an anode material of the pseudocapacitor have been relatively less conducted, and thus there is a continuing demand for the development of the anode material for an asymmetric pseudocapacitor with high capacity.

Particularly, as a material which is good for use as an electrode material for a pseudocapacitor, hierarchical structure materials having nano-sized fine structure and a micro-sized final particle size are known in terms of high activity due to a large specific surface area and excellent processability. These hierarchical nanomaterials generally require hydrothermal synthesis under high temperature and high pressure conditions or template synthesis. However, these processes have limitations in actual commercialization due to stability and process cost.

Therefore, there is a continuing demand for a method of easily preparing the hierarchical nanomaterials useful as an electrode material for a pseudocapacitor by a reaction in a solution phase rather than the hydrothermal synthesis under high temperature and high pressure conditions.

SUMMARY

The present disclosure is to provide a preparation method of an anode active material for a pseudocapacitor that is excellent in specific capacitance without applying high temperature and high pressure conditions.

The present disclosure is also to provide an anode composition for a pseudocapacitor including the anode active material prepared by the above method.

According to an embodiment of the present disclosure, a preparation method of an anode active material for a pseudocapacitor includes the steps of: preparing a mixed solution by mixing a precursor material of an iron oxide and a C1 to C18 alcohol-based compound, followed by adding an aqueous solution containing thiosulfate ions and sulfate ions; reacting the mixed solution at a temperature of 50° C. to 75° C. to prepare goethite iron oxide (alpha-FeOOH); and heat treating the goethite iron oxide (alpha-FeOOH) at a temperature of 250° C. to 400° C. to prepare hematite iron oxide (alpha-$Fe_2O_3$).

For example, the precursor material of the iron oxide may be at least one selected from the group consisting of iron chloride ($FeCl_3.6H_2O$), iron nitrate ($Fe(NO_3)_3.9H_2O$), iron sulfate ($Fe_2(SO_4)_3.xH_2O$), iron bromide ($FeBr_3$), iron perchlorate ($Fe(ClO_4)_3$), and iron phosphate ($FePO_4$).

In addition, the thiosulfate ions may be derived from at least one compound selected from the group consisting of sodium thiosulfate ($Na_2S_2O_3$), potassium thiosulfate ($K_2S_2O_3$), and barium thiosulfate ($BaS_2O_3$).

The sulfate ions may be derived from at least one compound selected from the group consisting of sodium sulfate ($Na_2SO_4$), lithium sulfate ($Li_2SO_4$), ammonium sulfate (($NH_4)_2SO_4$), and potassium sulfate ($K_2SO_4$).

The alcohol-based compound may be at least one selected from the group consisting of methanol, ethanol, propanol, and isopropanol.

Herein, a concentration of the mixed solution containing the precursor material of iron oxide may be 20 mM to 100 mM, and a concentration of the aqueous solution containing sulfate ions may be 40 mM to 200 mM.

In addition, a stoichiometric ratio of the precursor of iron oxide and a sum of the thiosulfate ions and the sulfate ions may be 1:1 to 1:7 based on the precursor of iron oxide, and the thiosulfate ions may be contained in a stoichiometric ratio of 1:1 to 1:4 based on the precursor of iron oxide.

For example, the hematite iron oxide (alpha-$Fe_2O_3$) may have an urchin-like structure in which nanorods are aggregated, and the nanorod may have a diameter of 10 nm to 200 nm and a length of 300 nm to 1000 nm. The hematite iron oxide (alpha-$Fe_2O_3$) may have a number average particle diameter of 0.6 micometers to 2 micometers. The hematite iron oxide (alpha-$Fe_2O_3$) may have a specific surface area of 40 $m^2$/g or more.

The preparation method of an anode active material for a pseudocapacitor may include the steps of: preparing a mixed solution by mixing iron chloride ($FeCl_3 \cdot 6H_2O$), iron nitrate ($Fe(NO_3)_3 \cdot 9H_2O$), or a mixture thereof with methanol, ethanol, or a mixture thereof, and then adding an aqueous solution containing sodium thiosulfate ($Na_2S_2O_3$) and sodium sulfate ($Na_2SO_4$), lithium sulfate ($Li_2SO_4$), or a mixture thereof; reacting the mixed solution at a temperature of 68° C. to 72° C. for 4 hours to 6 hours to prepare goethite iron oxide (alpha-FeOOH); and heat treating the goethite iron oxide (alpha-FeOOH) at a temperature of 250° C. to 400° C. for 2 hours to 4 hours to prepare hematite iron oxide (alpha-$Fe_2O_3$).

According to another embodiment of the present disclosure, an anode composition for a pseudocapacitor is provided, including the hematite iron oxide (alpha-$Fe_2O_3$) prepared by the above method.

The anode composition for a pseudocapacitor may have specific capacitance measured by cyclic voltammetry of 300 F/g or more in a 1 M KOH electrolyte.

According to an embodiment of the present disclosure, an anode active material for a pseudocapacitor having high specific capacitance may be prepared in a simple and inexpensive process without applying high temperature and high pressure conditions by synthesizing urchin-shaped goethite iron oxide (alpha-FeOOH) using an aqueous solution containing thiosulfate ions and sulfate ions, followed by heat treatment to synthesize hematite iron oxide (alpha-$Fe_2O_3$) having a nano-sized urchin-like structure.

BRIEF DESCRIPTION OF THE DRAWINGS

FIG. 1 is an image observed through a SEM (Scanning Electron Microscope) after applying the goethite iron oxide (alpha-FeOOH) prepared according to Comparative Example 1 on a surface of carbon tape (upper left: 50000 times magnification, upper right: 20000 times magnification, lower left: 5000 times magnification, lower right: 5000 times magnification).

FIG. 2 is an XRD (X-ray Diffraction) analysis graph measured after applying the goethite iron oxide (alpha-FeOOH) prepared according to Comparative Example 1 to a flat polymer holder with a uniform thickness (x-axis: 2-theta, y-axis: signal strength).

FIG. 3 is an image observed through a SEM (Scanning Electron Microscope) after applying the hematite iron oxide (alpha-$Fe_2O_3$) prepared according to Example 1 on a surface of carbon tape (upper left: 50000 times magnification, upper right: 20000 times magnification, lower left: 5000 times magnification, lower right: 500 times magnification).

FIG. 4 is an XRD (X-ray Diffraction) analysis graph measured after applying the hematite iron oxide (alpha-$Fe_2O_3$) prepared according to Example 1 to a flat polymer holder with a uniform thickness (x-axis: 2-theta, y-axis: signal strength).

FIG. 5 is an image observed through a SEM (Scanning Electron Microscope) after applying the jarosite ($NaFe_3(SO_4)_2(OH)_6$) prepared according to Comparative Example 2 on a surface of carbon tape (left: 5000 times magnification, right: 500 times magnification).

FIG. 6 is an image observed through a SEM (Scanning Electron Microscope) after applying the goethite iron oxide (alpha-FeOOH) prepared according to Comparative Example 3 on a surface of carbon tape (left: 5000 times magnification, right: 500 times magnification).

FIG. 7 is an image observed through a SEM (Scanning Electron Microscope) after applying the goethite iron oxide (alpha-FeOOH) prepared according to Comparative Example 4 on a surface of carbon tape (left: 100000 times magnification, right: 20000 times magnification).

FIG. 8 is a graph determined by cyclic voltammetry in a three-electrode system after dispersing an anode active material for a pseudocapacitor including the hematite iron oxide (alpha-$Fe_2O_3$) prepared according to Example 1, a conductive material (acetylene black), and a binder (PVDF) in NMP (N-methyl-2-pyrrolidone) solution at a ratio of 7:2:1 (solids content: 2.5%), and then applying it on a glassy carbon electrode (x-axis: potential with respect to Ag/AgCl reference electrode, y-axis: current, specific capacitance: 498 F/g in the $5^{th}$ cycle).

FIG. 9 is a graph determined by cyclic voltammetry in a three-electrode system after dispersing an anode active material for a pseudocapacitor including the goethite iron oxide (alpha-FeOOH) prepared according to Comparative Example 1, a conductive material (acetylene black), and a binder (PVDF) in NMP (N-methyl-2-pyrrolidone) solution at a ratio of 7:2:1 (solids content: 2.5%), and then applying it on a glassy carbon electrode (x-axis: potential with respect to Ag/AgCl reference electrode, y-axis: current, specific capacitance: 222 F/g in the $5^{th}$ cycle).

FIG. 10 is a graph determined by cyclic voltammetry in a three-electrode system after dispersing an anode active material for a pseudocapacitor including the jarosite ($NaFe_3(SO_4)_2(OH)_6$) prepared according to Comparative Example 2, a conductive material (acetylene black), and a binder (PVDF) in NMP (N-methyl-2-pyrrolidone) solution at a ratio of 7:2:1 (solids content: 2.5%), and then applying it on a glassy carbon electrode (x-axis: potential with respect to Ag/AgCl reference electrode, y-axis: current, specific capacitance: 54 F/g in the $5^{th}$ cycle).

DETAILED DESCRIPTION

In the present disclosure, the terms "first", "second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular forms disclosed herein, and it should be understood that the present invention includes all modifications, equivalents, and replacements within the idea and technical scope of the present invention.

Hereinafter, the present disclosure will be described in more detail.

According to an embodiment of the present disclosure, a preparation method of an anode active material for a pseudocapacitor includes the steps of: preparing a mixed solution by mixing a precursor material of iron oxide and a C1 to C18 alcohol-based compound, followed by adding an aqueous solution containing thiosulfate ions and sulfate ions; reacting the mixed solution at a temperature of 50° C. to 75° C. to prepare goethite iron oxide (alpha-FeOOH); and heat treating the goethite iron oxide (alpha-FeOOH) at a temperature of 250° C. to 400° C. to prepare hematite iron oxide (alpha-$Fe_2O_3$).

The present disclosure relates to a preparation method of an anode active material for an alkaline pseudocapacitor, and specifically to a preparation method of an anode active material that can be effectively used in a pseudocapacitor using a basic electrolyte so as to exhibit high activity without corrosiveness to metal materials. In particular, the present disclosure is characterized in that nanoparticles are prepared by synthesizing an urchin-like alpha-FeOOH precursor under atmospheric pressure and low temperature conditions, followed by heat treatment to synthesize alpha-$Fe_2O_3$ having a nano-sized urchin-like structure, wherein the nanoparticles can be used for the anode of a pseudocapacitor which uses a reversible oxidation-reduction reaction at the electrode/electrolyte interface as an energy storage device having both high energy density and high power. Particularly, the present disclosure is characterized in that the precursor of iron oxide ($FeO_xH_y$, wherein x is 1 to 3 and y is 0 to 4) with a size of several tens of nanometers is prepared at room temperature by mixing the precursor material of iron oxide with an aqueous solution containing thiosulfate ions and sulfate ions, and raising the reaction temperature to a temperature of about 50° C. to 75° C. to grow nanorods aggregated in the center. That is, the present disclosure is characterized by separating nucleus formation and crystal growth. In particular, in the present disclosure, it is possible to reduce the growth of an independent rod, not the urchin-like structure, at a low temperature by separating the nucleus formation and the growth. After the nucleus formation, a low temperature reaction can increase the thickness and length of the nanorod, thereby making into an urchin-like structure in which the overall size is not reduced.

In general, it is preferable that a material which is good for use as an electrode material for a pseudocapacitor has the following characteristics. In the pseudocapacitor, an electrochemical reaction occurs only in the region to a certain depth (several tens of nanometers) from the surface, and a charge is stored by this reaction. Therefore, the larger the specific surface area, the larger the area where the reaction proceeds, and thus excellent specific capacitance can be obtained. However, when the electrode active material is made in the form of small nanoparticles (about 10 nm), it may show high activity according to the large surface area, but inevitably increases a ratio of the conductive material/binder added in the electrode manufacturing process other than the active material. As a result, it may lead to a decrease in processability due to a low ratio of the active material and high viscosity in the electrode manufacturing process. Therefore, when the active material has a small nanostructured unit and a form in which the unit is assembled, it may have an advantage in the electrode manufacturing process with a large surface area.

Due to this necessity, hierarchical structure materials having a nano-sized fine structure and a micro-sized final particle size have been reported as the electrode material for a pseudocapacitor. These hierarchical nanomaterials generally require hydrothermal synthesis under high temperature and high pressure conditions or template synthesis. However, these processes have limitations in actual commercialization due to stability and process cost. In particular, surfactants (cetyltrimethylammonium bromide, sodium dodecyl sulfonate, etc.) are frequently used to synthesize hierarchical structures such as an urchin-like structure in the hydrothermal synthesis. The primary structures, such as nanorods or nanoplates synthesized under the high temperature/high pressure environment are normally aggregated, and a purpose of the surfactant is to control the aggregation to make a secondary structure. However, the present disclosure provides a preparation method of an anode active material for a pseudocapacitor, which does not use the above-mentioned surfactant and which can be effectively applied to actual commercialization without using hydrothermal synthesis under high temperature and high pressure conditions.

In the present disclosure, the precursor material of iron oxide may be at least one selected from the group consisting of iron chloride ($FeCl_3.6H_2O$), iron nitrate ($Fe(NO_3)_3.9H_2O$), iron sulfate ($Fe_2(SO_4)_3.xH_2O$), iron bromide ($FeBr_3$), iron perchlorate ($Fe(ClO_4)_3$), and iron phosphate ($FePO_4$). Iron chloride ($FeCl_3.6H_2O$), iron nitrate ($Fe(NO_3)_3.9H_2O$), or the like, is more preferable in terms of the pH of a synthetic solution.

The alcohol-based compound mixed with the precursor material of iron oxide has 1 to 18 carbon atoms, and is preferably a monohydric alcohol compound containing one hydroxyl group. For example, the alcohol-based compound may be at least one selected from the group consisting of methanol, ethanol, propanol, and isopropanol, and may preferably be methanol, ethanol, or the like, in terms of solubility of a salt.

A concentration of the mixed solution containing the precursor material of iron oxide may be 20 mM to 100 mM, preferably 30 mM to 50 mM. Herein, the concentration may be 20 mM or more in terms of a yield of synthetic particles, and may be 100 mM or less in terms of uniformity of particles.

In addition, the precursor material of iron oxide is mixed with an aqueous solution containing thiosulfate ions and sulfate ions to prepare goethite iron oxide (alpha-FeOOH). Herein, the thiosulfate ion may be derived from at least one compound selected from the group consisting of sodium thiosulfate ($Na_2S_2O_3$), potassium thiosulfate ($K_2S_2O_3$), and barium thiosulfate ($BaS_2O_3$). The sulfate ion may be derived from at least one compound selected from the group consisting of sodium sulfate ($Na_2SO_4$), lithium sulfate ($Li_2SO_4$), ammonium sulfate (($NH_4)_2SO_4$), and potassium sulfate ($K_2SO_4$). In particular, it is preferable to use sodium thiosulfate ($Na_2S_2O_3$) or the like so that the iron oxide component prepared according to the present disclosure can effectively form an urchin-like structure. By reacting under the condition in which the thiosulfate ions are present, it is possible to prepare goethite iron oxide (alpha-FeOOH) having an urchin-like structure with a short process time of about 48 hours or less, about 24 hours or less, or about 6 hours or less, even at a low temperature of about 75° C. or less. Herein, it is preferable to use sodium sulfate ($Na_2SO_4$), lithium sulfate ($Li_2SO_4$), or the like to control a thickness and a length of the nanorod forming the urchin-like particles in an optimum range.

In particular, a diameter and a size of the nanorod of hematite iron oxide (alpha-$Fe_2O_3$) which is finally formed can be sufficiently increased so as to ensure higher specific capacitance during processing to the anode for a pseudocapacitor by adding the sulfate ion together with the thiosulfate ion.

A concentration of the aqueous solution containing the thiosulfate ions and the sulfate ions may be 40 mM to 200 mM, preferably 70 mM to 130 mM, in total of the thiosulfate ions and the sulfate ions. Herein, the concentration of the aqueous solution may be 40 mM or more to effectively form particles having the urchin-like structure from the iron oxide component, and may be 200 mM or less in terms of solubility of thiosulfate ions and sulfate ions in the aqueous solution.

In addition, a stoichiometric ratio of the precursor of iron oxide and a sum of the thiosulfate ions and the sulfate ions may be 1:1 to 1:7, preferably 1:2 to 1:4 based on the precursor of iron oxide. For example, the precursor of iron oxide, the precursor of thiosulfate ions, and the precursor of sulfate ions may be added to react in an amount such that the sum of the thiosulfate ions ($S_2O_3^{2-}$) and the sulfate ions ($SO_4^{2-}$) is 1 to 7 equivalents based on one equivalent of iron ions ($Fe^{3+}$) contained in the precursor of iron oxide. Herein, the thiosulfate ion and the sulfate ion may be contained in an amount of 1:1 or higher, or 1:1 to 1:4. In particular, when the thiosulfate ions are contained in a ratio of 1:1 or higher, nucleus formation is possible, and as a result, FeOOH having an urchin-like structure can be obtained. There is no fixed mixing ratio of the thiosulfate ions and the sulfate ions, if the amount of thiosulfate is more than the specified amount. However, it is appropriate to use in a ratio of 1:0 to 1:3 based on iron, because it is not dissolved in the ethanol/water solution if a certain amount or more is added.

Herein, the thiosulfate ions may be used in a stoichiometric ratio of 1:1 to 1:4 based on the precursor of iron oxide in terms of promoting nucleation at room temperature. For example, the precursor of iron oxide and the precursor of thiosulfate ions may be added to react in an amount such that the thiosulfate ions ($S_2O_3^{2-}$ are contained at 1 to 4 equivalents based on one equivalent of iron ions ($Fe^{3+}$) contained in the precursor of iron oxide.

Meanwhile, goethite iron oxide (alpha-FeOOH) is prepared by adding an aqueous solution containing thiosulfate ions and sulfate ions to the alcohol-based mixed solution of the precursor material of iron oxide, followed by reacting. The step of preparing the goethite iron oxide (alpha-FeOOH) may be carried out at a temperature of 50° C. to 75° C., preferably 65° C. to 75° C., more preferably 68° C. to 72° C. Herein, the reaction temperature is preferably 50° C. or more in terms of reaction progress and yield of particles, and is preferably 75° C. or less to suppress evaporation of a solvent. In particular, the reaction to prepare the goethite iron oxide (alpha-FeOOH) may be carried out under atmospheric pressure and low temperature conditions, rather than the existing high temperature and high pressure conditions. For example, the reaction may be carried out at about 1 atm or more to suppress evaporation of the solvent, and may be carried out at about 2 atm or less in terms of stability of the process.

In addition, the step of preparing the goethite iron oxide (alpha-FeOOH) may be carried out for about 2 hours or more or about 2 to 48 hours, preferably about 3 hours or more or about 3 to 24 hours, more preferably about 4 hours or more or about 4 to 6 hours. Herein, the reaction time is preferably about 4 hours or more in terms of a yield of particles, and more preferably about 6 hours or less to improve process efficiency.

The present disclosure is characterized in that the precursor of iron oxide ($FeO_xH_y$, wherein x is 1 to 3 and y is 0 to 4) having a size of about 20 nanometers (nm) to 200 nanometers (nm), preferably about 50 nm to 150 nm, is prepared at room temperature using thiosulfate ions such as sodium thiosulfate and sulfate ions such as sodium sulfate, and then the reaction temperature is raised to grow nanorods around the precursor of iron oxide, thereby forming particles having an urchin-like structure (alpha-FeOOH). In particular, in the present disclosure, it is possible to reduce the growth of an independent rod, not having the urchin-like structure, at a low temperature by separating nucleus formation and growth. After the nucleus formation, a low temperature reaction can increase the thickness and length of the nanorod, thereby making it into an urchin-like structure in which the overall size is not reduced.

In particular, the resulting goethite iron oxide (alpha-FeOOH) has an urchin-like structure in which nanorods are aggregated. For example, about 70 or more, or about 70 to about 550 nanorods, preferably about 100 or more, or about 100 to about 500 nanorods, more preferably about 150 or more, or about 150 to about 300 nanorods, can be aggregated. The goethite iron oxide (alpha-FeOOH) may have the structure in which about 70 or more, preferably about 100 or more, more preferably about 150 or more, nanorods are aggregated in terms of forming the urchin-like structure of excellent size and shape.

Herein, the nanorod may have a diameter corresponding to a short axis of 10 nm to 200 nm, preferably about 30 nm to 70 nm. The diameter of the nanorod may be about 30 nm or more in terms of stability of the electrochemical reaction, and may be about 70 nm or less in terms of activity of the electrochemical reaction. In addition, the nanorod may have a length corresponding to a long axis of about 300 nm to 1000 nm, preferably about 400 nm to 700 nm. Herein, the length of the nanorod may be about 300 nm or more in terms of structural stability, and may be about 1000 nm or less in terms of electrical conductivity. In particular, when no sulfate ion is present in the step of preparing the goethite iron oxide (alpha-FeOOH), the length of the nanorod is greatly reduced to about 250 nm or less, and the overall size may also be reduced.

The goethite iron oxide (alpha-FeOOH) having the urchin-like structure in which nanorods are aggregated may have a particle size corresponding to an outer diameter formed by the ends of the long axis of the nanorods, that is, a number average particle diameter of 0.3 micrometers to 3 micrometers, preferably 0.6 micrometers to 2 micrometers. The number average particle diameter of the goethite iron oxide (alpha-FeOOH) may be 0.6 micrometers or more in terms of structural stability, and may be 2 micrometers or less in terms of mass and electric transfer.

In addition, the goethite iron oxide (alpha-FeOOH) may have a specific surface area of 40 m$^2$/g or more, or 40 m$^2$/g to 200 m$^2$/g, preferably 75 m$^2$/g or more, or 75 m$^2$/g to 200 m$^2$/g, as measured by a method using adsorption/desorption of nitrogen gas at a liquid nitrogen temperature (about −196° C.). Herein, it may be 40 m$^2$/g or more in terms of particle activity. When the specific surface area of the anode active material is too large, a large amount of conductive materials and binders may be required in the preparation of the electrode. Therefore, it is desirable to maintain the appropriate range.

Meanwhile, after preparing the goethite iron oxide (alpha-FeOOH) as described above, the goethite iron oxide (alpha-FeOOH) is subjected to a heat treatment process to prepare hematite iron oxide (alpha-Fe$_2$O$_3$).

The heat treatment process can be performed in the presence of oxygen, argon, nitrogen, air, or a mixture thereof, or under vacuum. However, it may be performed in the presence of air in terms of overall process cost reduction and process convenience.

The step of preparing the hematite iron oxide (alpha-Fe$_2$O$_3$) may be carried out at a temperature of about 250° C. to about 400° C., preferably about 300° C. to about 350° C. Herein, the reaction temperature of the heat treating step should be about 250° C. or more in order to effectively convert the goethite iron oxide (alpha-FeOOH) to the hematite iron oxide (alpha-Fe$_2$O$_3$). In order to prevent aggregation of the goethite iron oxide (alpha-FeOOH) and the hematite iron oxide (alpha-Fe$_2$O$_3$) by particle sintering, the reaction temperature should be about 400° C. or less. In particular, the heat treatment may be carried out under atmospheric pressure, not by the hydrothermal reaction under high temperature and high pressure conditions. The step of preparing the hematite iron oxide (alpha-Fe$_2$O$_3$) may be carried out for about 30 minutes or more, or about 30 minutes to about 6 hours, preferably about 2 hours to about 4 hours. Herein, the reaction time may be about 30 minutes or more in terms of improving a conversion rate, and preferably about 6 hours or less in terms of improving process efficiency. In particular, even if the heat treatment at 100° C. for a long time under an aqueous solution condition may convert it to hematite, but may cause a problem that the urchin-like structure is not maintained. In the present disclosure, after synthesizing and separating the goethite iron oxide (alpha-FeOOH), the goethite iron oxide is subjected to heat treatment under specific conditions to synthesize hematite maintaining the urchin-like structure without structural change.

In addition, the hematite iron oxide (alpha-Fe$_2$O$_3$) thus prepared may maintain the structure of the precursor without structural changes such as aggregation and decomposition, and has an urchin-like structure in which nanorods are aggregated. For example, about 70 or more, or about 70 to about 550 nanorods, preferably about 100 or more, or about 100 to about 500 nanorods, more preferably about 150 or more, or about 150 to about 300 nanorods, can be aggregated. Herein, the nanorod may have a diameter of 10 nm to 200 nm, preferably about 30 nm to 70 nm. The diameter of the nanorod may be about 30 nm or more in terms of stability of the electrochemical reaction, and may be about 70 nm or less in terms of activity of the electrochemical reaction. In addition, the nanorod may have a length of about 300 nm to 1000 nm, preferably about 400 nm to 700 nm. Herein, the length of the nanorod may be about 300 nm or more in terms of structural stability, and may be about 1000 nm or less in terms of electrical conductivity.

The hematite iron oxide (alpha-Fe$_2$O$_3$) having the urchin-like structure in which nanorods are aggregated may have a particle size corresponding to an outer diameter formed by the ends of the long axis of the nanorods, that is, a number average particle diameter of 0.3 micrometers to 3 micrometers, preferably 0.6 micrometers to 2 micrometers. The number average particle diameter of the hematite iron oxide (alpha-Fe$_2$O$_3$) may be 0.6 micrometers or more in terms of structural stability, and may be 2 micrometers or less in terms of mass and electric transfer. In particular, the hematite iron oxide (alpha-Fe$_2$O$_3$) obtained according to the present disclosure has an urchin-like structure in which nanorods are aggregated, and this is very advantageous for mass transfer even at similar particle diameters. For this reason, high activity can be exhibited in a high current pseudocapacitor.

Meanwhile, the hematite iron oxide (alpha-Fe$_2$O$_3$) may have a specific surface area of 40 m$^2$/g or more, or 40 m$^2$/g to 200 m$^2$/g, preferably 70 m$^2$/g or more, or 70 m$^2$/g to 200 m$^2$/g, as measured by a method using adsorption/desorption of nitrogen gas at a liquid nitrogen temperature. Herein, it may be 40 m$^2$/g or more in terms of particle activity.

In particular, according to a preferred embodiment of the present disclosure, the preparation method of an anode active material for a pseudocapacitor may include the steps of: preparing a mixed solution by mixing iron chloride (FeCl$_3$.6H$_2$O), iron nitrate (Fe(NO$_3$)$_3$.9H$_2$O), or a mixture thereof with methanol, ethanol, or a mixture thereof, and then adding an aqueous solution containing sodium thiosulfate (Na$_2$S$_2$O$_3$) and sodium sulfate (Na$_2$SO$_4$), lithium sulfate (Li$_2$SO$_4$), or a mixture thereof; reacting the mixed solution at a temperature of 68° C. to 72° C. for 4 to 6 hours to prepare goethite iron oxide (alpha-FeOOH); and heat treating the goethite iron oxide (alpha-FeOOH) at a temperature of 250° C. to 400° C. for 2 to 4 hours to prepare hematite iron oxide (alpha-Fe$_2$O$_3$).

Specific examples of the preparation method of the anode active material for a pseudocapacitor may refer to the following examples. However, the preparation method of the anode active material for a pseudocapacitor is not limited to this description. The preparation method may further include a step which is usually carried out in the technical field of the present invention, and the step(s) of the preparation method may be changed by the usually changeable step(s).

According to another embodiment of the present disclosure, an anode composition for a pseudocapacitor includes the hematite iron oxide (alpha-Fe$_2$O$_3$) prepared by the method as described above as an active material.

The anode composition for a pseudocapacitor may further include at least one conductive material selected from the group consisting of carbon black, acetylene black, activated carbon, carbon nanotubes, and Vulcan carbon. Preferably, carbon black, acetylene black, or the like may be used in terms of price and accessibility. In addition, the anode composition for a pseudocapacitor may further include at least one binder selected from the group consisting of poly-vinylidene fluoride (PVDF), polytetrafluoroethylene (PTFE), Nafion, and carboxymethyl cellulose (CMC). Preferably, PVDF, PTFE, or the like may be used in terms of structural stability in the electrolyte.

The composition, structure, and physical properties of the hematite iron oxide (alpha-Fe$_2$O$_3$) used as the active material in the anode composition for a pseudocapacitor are as described above.

As described above, the anode composition for a pseudocapacitor according to an embodiment of the present disclosure may have specific capacitance measured by cyclic voltammetry of 300 F/g or more, or 300 F/g to 800 F/g, preferably 400 F/g or more, or 400 F/g to 800 F/g, in a 1 M KOH electrolyte, wherein the specific capacitance is measured on a dried electrode after applying an ink including an electrode material, a conductive material, and a binder on a glassy carbon electrode. For example, it may have the specific capacitance range as described above in the first, second, and fifth cycles. Accordingly, the anode active material for a pseudocapacitor of the present disclosure may exhibit excellent performance in terms of energy density.

In the present disclosure, details other than those described above may be adjusted as necessary, and are not specifically limited.

Hereinafter, the present invention will be described in more detail with reference to examples. However, these examples are for illustrative purposes only, and the invention is not intended to be limited by these examples.

EXAMPLES

Comparative Example 1

1.2 g of sodium sulfate ($Na_2SO_4$) and 2 g of sodium thiosulfate ($Na_2S_2O_3$) were dissolved in 100 mL of $H_2O$ to prepare an aqueous solution containing thiosulfate ions and sulfate ions. In addition, 2.02 g of iron chloride ($FeCl_3 \cdot 6H_2O$) was dissolved in 100 mL of ethanol to prepare a mixed solution containing a precursor material of iron oxide. The aqueous solution containing thiosulfate ions and sulfate ions was mixed with the mixed solution of the alcohol and the precursor material, and stirred for about 2 minutes. Subsequently, the mixture of the precursor material and the sulfate ions was stirred at about 850 rpm for about 5 hours under atmospheric pressure at about 70° C. to prepare 300 mg of goethite iron oxide (alpha-FeOOH) (yield: 45%).

FIG. 1 shows a SEM (Scanning Electron Microscope) image observed after applying the dried goethite iron oxide (alpha-FeOOH) on a surface of carbon tape. FIG. 2 shows an XRD (X-ray Diffraction) analysis graph measured after applying the dried goethite iron oxide to a polymer holder with a uniform thickness. In was confirmed from the SEM image of FIG. 1 that at least about 200 nanorods having a diameter of about 50 nm and a length of about 500 nm were aggregated to form an urchin-like structure (number average particle diameter: about 1.3 micrometers). In addition, it was confirmed from the XRD analysis graph of FIG. 2 that a crystal structure of the obtained iron oxide was consistent with the goethite (alpha-FeOOH). Herein, a specific surface area measured by a BET method using adsorption/desorption of nitrogen gas was 85 $m^2/g$.

Example 1

1-1. Preparation of goethite iron oxide (alpha-FeOOH)

1.2 g of sodium sulfate ($Na_2SO_4$) and 2 g of sodium thiosulfate ($Na_2S_2O_3$) were dissolved in 100 mL of $H_2O$ to prepare an aqueous solution containing thiosulfate ions and sulfate ions. In addition, 2.02 g of iron chloride ($FeCl_3 \cdot 6H_2O$) was dissolved in 100 mL of ethanol to prepare a mixed solution containing a precursor material of iron oxide. The aqueous solution containing thiosulfate ions and sulfate ions was mixed with the mixed solution of the alcohol and the precursor material, and stirred for about 2 minutes. Subsequently, the mixture of the precursor material and the sulfate ions was stirred at about 850 rpm for about 5 hours under atmospheric pressure at about 70° C. to prepare 300 mg of goethite iron oxide (alpha-FeOOH) (yield: 45%).

It was confirmed from a SEM (Scanning Electron Microscope) image observed after applying the dried goethite iron oxide (alpha-FeOOH) on a surface of carbon tape that at least about 200 nanorods having a diameter of about 50 nm and a length of about 500 nm were aggregated to form an urchin-like structure (number average particle diameter: about 1.3 micrometers). In addition, it was confirmed from an XRD (X-ray Diffraction) analysis graph measured after applying the dried goethite iron oxide to a polymer holder with a uniform thickness that a crystal structure of the obtained iron oxide was consistent with the goethite (alpha-FeOOH). Herein, a specific surface area measured by a BET method using adsorption/desorption of nitrogen gas was 85 $m^2/g$.

1-2. Preparation of Hematite Iron Oxide (alpha-$Fe_2O_3$)

300 mg of the goethite iron oxide (alpha-FeOOH) prepared in the step 1-1 was heat treated in the presence of air under atmospheric pressure and at a temperature of about 300° C. for about 3 hours, thereby preparing 260 mg of hematite iron oxide (alpha-$Fe_2O_3$) as an anode active material. Herein, no change such as aggregation and decomposition was observed in the particle structure, and it was confirmed that the shape of the precursor was maintained in the urchin-like structure.

FIG. 3 shows a SEM (Scanning Electron Microscope) image observed after applying the dried hematite iron oxide (alpha-$Fe_2O_3$) on a surface of carbon tape. FIG. 4 shows an XRD (X-ray Diffraction) analysis graph measured after applying the dried goethite iron oxide to a polymer holder with a uniform thickness. Herein, a specific surface area measured by a BET method using adsorption/desorption of nitrogen gas was 77 $m^2/g$. In was confirmed from the SEM image of FIG. 3 that the hematite iron oxide (alpha-$Fe_2O_3$) also had an urchin-like structure in which at least about 200 nanorods having a diameter of about 50 nm and a length of about 500 nm were aggregated (number average particle diameter: about 1.3 micrometers) in the same manner as the goethite iron oxide (alpha-FeOOH). In addition, it was confirmed from the XRD analysis graph of FIG. 4 that a crystal structure of the obtained iron oxide was consistent with the hematite (alpha-$Fe_2O_3$).

Comparative Example 2

An anode active material was prepared in the same manner as in Example 1, except that sodium thiosulfate ($Na_2S_2O_3$) was excluded and sodium sulfate ($Na_2SO_4$) and iron chloride ($FeCl_3 \cdot 6H_2O$) were used in the preparation of goethite iron oxide (alpha-FeOOH). In this case, a material called jarosite ($NaFe_3(SO_4)_2(OH)_6$) was synthesized, and it was confirmed that it did not have an urchin-like structure at all.

FIG. 5 shows a SEM (Scanning Electron Microscope) image observed after applying the dried jarosite ($NaFe_3(SO_4)_2(OH)_6$) on a surface of carbon tape. In was confirmed from the SEM image of FIG. 5 that it had a structure of flower-shaped amorphous microparticles having a number average particle diameter of 10 micrometers or more.

Comparative Example 3

An anode active material was prepared in the same manner as in Example 1, except that sodium sulfate ($Na_2SO_4$) was excluded and sodium thiosulfate ($Na_2S_2O_3$) and iron chloride ($FeCl_3 \cdot 6H_2O$) were used in the preparation of goethite iron oxide (alpha-FeOOH).

In this case, goethite iron oxide (alpha-FeOOH) was prepared, but the thickness and length of the nanorod forming the urchin-like structure were reduced and the overall size was also reduced. FIG. 6 shows a SEM (Scanning Electron Microscope) image observed after applying the dried goethite iron oxide (alpha-FeOOH) on a surface of carbon tape. In was confirmed from the SEM image of FIG. 6 that at least about 200 nanorods having a diameter of about 25 nm and a length of about 250 nm were aggregated to form an urchin-like structure (number average particle diameter: about 0.45 micrometers). Herein, a specific surface area measured by a BET method using adsorption/desorption of nitrogen gas was 75 m$^2$/g.

Comparative Example 4

An anode active material was prepared in the same manner as in Example 1, except that the mixed solution of the precursor material and sulfate ions was reacted at room temperature (about 25° C. to 30° C. ° C.) for about 5 hours in the preparation of goethite iron oxide (alpha-FeOOH). In this case, goethite iron oxide (alpha-FeOOH) in the form of particles was synthesized.

FIG. 7 shows a SEM (Scanning Electron Microscope) image observed after applying the goethite iron oxide (alpha-FeOOH) on a surface of carbon tape. In was confirmed from the SEM image of FIG. 7 that it was in the form of amorphous particulate, not a nanorod or urchin-like form.

Experimental Examples

After preparing a pseudocapacitor by using the anode active material prepared according to any one of Example 1 and Comparative Examples 1 to 3 in the following manner, battery performance was evaluated.

Preparation of Pseudocapacitor

The electrode active material, a conductive material (acetylene black), and a binder (PVDF) were dispersed in an NMP solution, and then applied on a glassy carbon electrode and dried to prepare a pseudocapacitor electrode (active material: conductive material: binder=70:20:10 based on total solids material).

Specific Capacitance Measurement

The specific capacitance of the pseudocapacitor was evaluated by cyclic voltammetry using Ag/AgCl as a reference electrode in a voltage range of 0 V to −1.1 V, and the results are shown in Table 1 below.

In evaluating the electrochemical performance by three-electrode measurement in a 1 M KOH solution, the maximum capacity at the 5$^{th}$ cycle was measured (active material: conductive material: binder=70:20:10 based on total solids material).

TABLE 1

| | Anode active material | | | Specific |
|---|---|---|---|---|
| | Composition | Crystal structure | Shape | Specific surface area (m$^2$/g) | capacitance (based on 5$^{th}$ cycle, F/g) |
| Ex. 1 | alpha-Fe$_2$O$_3$ | hematite | urchin-like shape | 77 | 498 |
| Comp. Ex. 1 | alpha-FeOOH | goethite | urchin-like shape | 85 | 222.47 |
| Comp. Ex. 2 | NaFe$_3$(SO$_4$)$_2$(OH)$_6$ | jarosite | micro-particles | — | 54.80 |
| Comp. Ex. 3 | alpha-FeOOH | goethite | urchin-like shape | 75 | 194.5 |

Referring to Table 1 above, it was confirmed that goethite iron oxide (alpha-FeOOH) and hematite iron oxide (alpha-Fe$_2$O$_3$) had the same structure, but the hematite iron oxide (alpha-Fe$_2$O$_3$) had higher specific capacitance than the other.

In addition, graphs determined by cyclic voltammetry in a three-electrode system (x-axis: potential with respect to Ag/AgCl reference electrode, y-axis: current) for the pseudocapacitor using one of the anode active material prepared in Example 1 and Comparative Examples 1 and 2 are shown in FIGS. 8, 9, and 10, respectively.

In particular, as shown in FIG. 8, when the anode active material for a pseudocapacitor including the hematite iron oxide (alpha-Fe$_2$O$_3$) of Example 1 was applied, the specific capacitance was 355 F/g in the 1$^{st}$ cycle, 458 F/g in the 2$^{nd}$ cycle, and 498 F/g in the 5$^{th}$ cycle, which can be characterized as excellent performance.

On the other hand, as shown in FIG. 9, when the goethite iron oxide (alpha-FeOOH) of Comparative Example 1 was applied, the specific capacitance was 266.40 F/g in the 1$^{st}$ cycle, 263.50 F/g in the 2$^{nd}$ cycle, and 222.47 F/g in the 5$^{th}$ cycle. As shown in FIG. 10, when the jarosite (NaFe$_3$(SO$_4$)$_2$(OH)$_6$) of Comparative Example 2 was applied, the specific capacitance was 97.22 F/g in the 1$^{st}$ cycle and 54.80 F/g in the 5$^{th}$ cycle, which is very low.

In particular, it was confirmed that a material having a completely different shape and crystal structure was synthesized in Comparative Example 2, which was the same as Example 1 except that sodium thiosulfate was not used. As a result, when the thiosulfate ion is present in the synthesis process, goethite iron oxide (alpha-FeOOH) having an urchin-like structure can be effectively prepared even at a low temperature.

The invention claimed is:

1. A preparation method of an anode active material, comprising the steps of:
   preparing a mixed solution by mixing a precursor material of iron oxide and a C1 to C18 alcohol-based compound, followed by adding an aqueous solution containing thiosulfate ions and sulfate ions;
   reacting the mixed solution at a temperature of 50° C. to 75° C. to prepare goethite iron oxide (alpha-FeOOH); and
   heat treating the goethite iron oxide (alpha-FeOOH) at a temperature of 250° C. to 400° C. to prepare hematite iron oxide (alpha-Fe$_2$O$_3$).

2. The preparation method of an anode active material according to claim 1,
   wherein the precursor material of iron oxide is at least one selected from the group consisting of iron chloride (FeCl$_3$.6H$_2$O), iron nitrate (Fe(NO$_3$)$_3$.9H$_2$O), iron sulfate (Fe$_2$(SO$_4$)$_3$.xH$_2$O), iron bromide (FeBr$_3$), iron perchlorate (Fe(ClO$_4$)$_3$), and iron phosphate (FePO$_4$).

3. The preparation method of an anode active material according to claim 1,
   wherein the thiosulfate ion is derived from at least one compound selected from the group consisting of sodium thiosulfate (Na$_2$S$_2$O$_3$), potassium thiosulfate (K$_2$S$_2$O$_3$), and barium thiosulfate (BaS$_2$O$_3$).

4. The preparation method of an anode active material according to claim 1,
   wherein the sulfate ions are derived from at least one compound selected from the group consisting of sodium sulfate (Na$_2$SO$_4$), lithium sulfate (Li$_2$SO$_4$), ammonium sulfate ((NH$_4$)$_2$SO$_4$), and potassium sulfate (K$_2$SO$_4$).

5. The preparation method of an anode active material according to claim 1,
   wherein the alcohol-based compound is at least one selected from the group consisting of methanol, ethanol, propanol, and isopropanol.

6. The preparation method of an anode active material according to claim 1,
   wherein a concentration of the mixed solution containing the precursor material of iron oxide is 20 mM to 100 mM.

7. The preparation method of an anode active material according to claim 1,
wherein a concentration of the aqueous solution containing thiosulfate ions and sulfate ions is 40 mM to 200 mM in total of the thiosulfate ions and the sulfate ions.

8. The preparation method of an anode active material according to claim 1,
wherein a stoichiometric ratio of the precursor of iron oxide and a sum of the thiosulfate ions and the sulfate ions is 1:1 to 1:7 based on the precursor of iron oxide.

9. The preparation method of an anode active material according to claim 1,
wherein the thiosulfate ion is contained in a stoichiometric ratio of 1:1 to 1:4 based on the precursor of iron oxide.

10. The preparation method of an anode active material according to claim 1,
wherein the hematite iron oxide (alpha-$Fe_2O_3$) has an urchin-like structure in which nanorods are aggregated.

11. The preparation method of an anode active material according to claim 10,
wherein the nanorods have a diameter of 10 nm to 200 nm and a length of 300 nm to 1000 nm.

12. The preparation method of an anode active material according to claim 10,
wherein the hematite iron oxide (alpha-$Fe_2O_3$) has a number average particle diameter of 0.6 micrometers to 2 micrometers.

13. The preparation method of an anode active material for the pseudocapacitor according to claim 1, wherein the hematite iron oxide (alpha-$Fe_2O_3$) has a specific surface area of 40 $m^2$/g or more.

14. The preparation method of an anode active material according to claim 1, wherein:
preparing the mixed solution comprises mixing iron chloride ($FeCl_3.6H_2O$), iron nitrate ($Fe(NO_3)_3.9H_2O$), or a mixture thereof with methanol, ethanol, or a mixture thereof, and then adding an aqueous solution containing sodium thiosulfate ($Na_2S_2O_3$) and sodium sulfate ($Na_2SO_4$), lithium sulfate ($Li_2SO_4$), or a mixture thereof;
reacting the mixed solution reacting at a temperature of 68° C. to 72° C. for 4 hours to 6 hours to prepare goethite iron oxide (alpha-FeOOH); and
heat treating the goethite iron oxide (alpha-FeOOH) comprising heating at a temperature of 250° C. to 400° C. for 2 to 4 hours to prepare hematite iron oxide (alpha-$Fe_2O_3$).

15. An anode composition for a pseudocapacitor, comprising the hematite iron oxide (alpha-$Fe_2O_3$) prepared by the method according to claim 1 as an active material.

16. The anode composition for the pseudocapacitor according to claim 15,
wherein specific capacitance measured by cyclic voltammetry is 300 F/g or more in a 1 M KOH electrolyte.

* * * * *